UNITED STATES PATENT OFFICE.

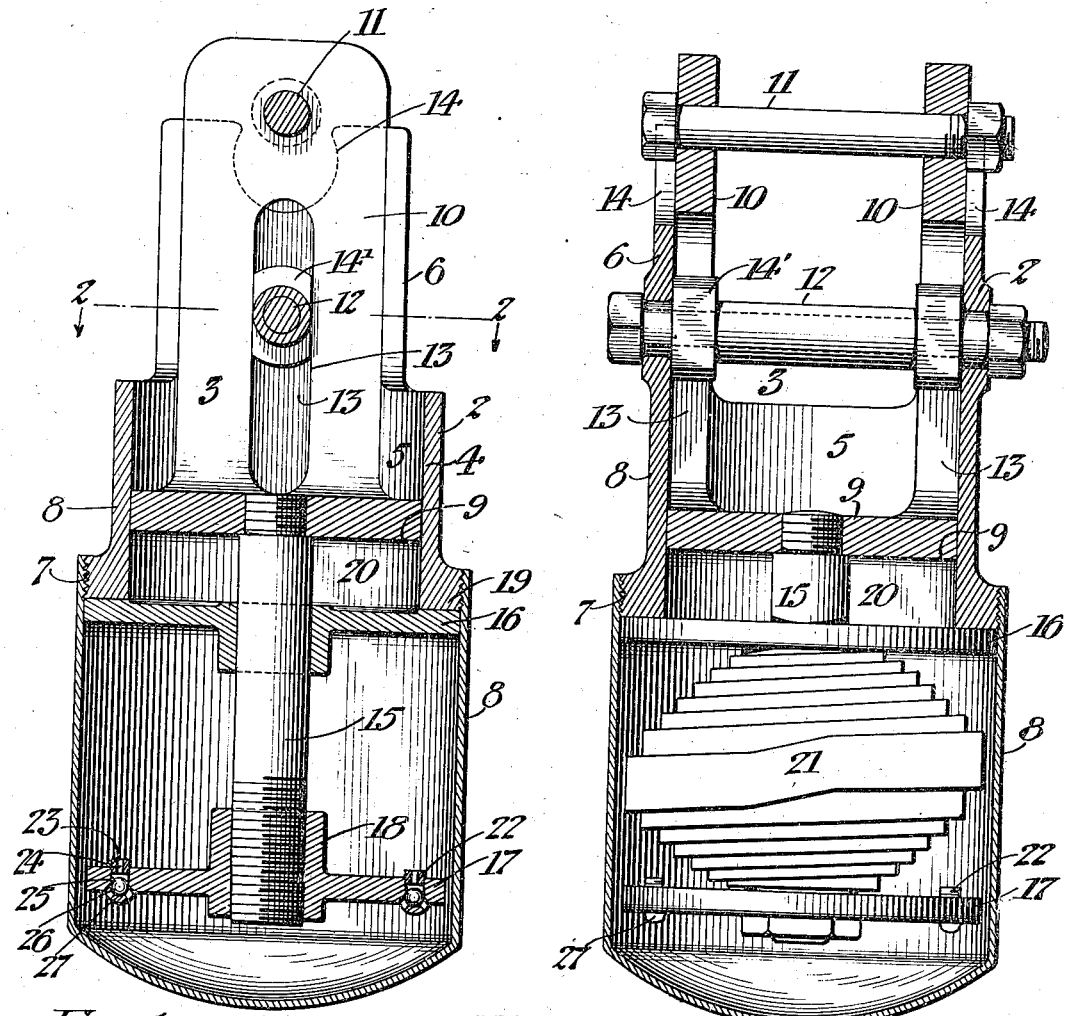

JOHN GRAW ROCK, OF NEW ROCHELLE, NEW YORK, ASSIGNOR TO VOLUTE SPRING SHOCK ABSORBER COMPANY, OF MOUNT VERNON, NEW YORK.

SHOCK-ABSORBER.

1,143,069.

Specification of Letters Patent. Patented June 15, 1915.

Application filed September 16, 1914. Serial No. 862,034.

*To all whom it may concern:*

Be it known that I, JOHN GRAW ROCK, a subject of the King of Norway, residing at New Rochelle, in the county of Westchester and State of New York, have invented certain new and useful Improvements in Shock-Absorbers, of which the following is a specification.

This invention has to do with shock absorbers of that class particularly adapted for use with motor vehicles, the object of the invention being to provide an improved shock absorber in which all the vertical stresses, whether up or down, will operate to compress the spring of the shock absorber thus avoiding the usual and less desirable alternating compression and tension effects.

A further object of the invention is the provision of an improved shock absorber extremely efficient in use, comparatively simple and inexpensive in construction, and in which the efficiency of the spring is materially increased by the action of the lubricating oil as well as by the action of the air within the structure, so that this improved shock absorber may be well considered as partly pneumatic, partly hydraulic, and partly spring operated, so that the present improved shock absorber is, as hereinbefore stated, highly efficient by reason of the combined pneumatic, hydraulic and spring action of the structure.

In the drawings accompanying and forming part of this specification, Figure 1 is a vertical cross-sectional view of this improved shock absorber with the spring omitted; Fig. 2 is a horizontal cross-sectional view taken in line 2—2, Fig. 1; and Fig. 3 is likewise a vertical cross-sectional view taken at a different angle from that shown in Fig. 1.

Similar characters of reference indicate corresponding parts throughout the several figures of the drawings.

In the preferred embodiment thereof shown and described, this improved shock absorber comprises a pair of members 2 and 3 each having a pair of arms sliding relatively to each other, each pair of said arms carrying means for attachment to a part of the vehicle. The member 2 comprises a cylindrical portion 4 forming as it were a piston chamber 5, and provided with extending concavo-convex arms 6 and also provided externally thereof with threads 7 for the reception of a cylindrical housing or casing 8. Within the chamber 5 of the member 2 for sliding movement therein is the member 3, this comprising a disk 9 likewise having a pair of arms 10 of exteriorly convex form to conform to the concave formation of the arms 6 of the member 2. The arms 10 are provided at their upper ends with a transverse bolt 11 for attachment for instance to the under spring or axle spring of the vehicle, and the member 2 is provided with a transverse bolt 12 for attachment to the body spring for instance of the vehicle, and this last bolt 12 slides within an elongated slot 13 in each arm 10 of the member 3, for which purpose it passes through a sliding block 14' located in each of said elongated slots 13 and having a laterally extending bushing. The upper ends of the arms 6 are cut out as at 14 so that a proper movement of the parts may be obtained without interference by reason of the head and nut of the bolt 11. Carried by the disk 9, it being preferably threaded thereinto, is a rod or bolt 15 and this rod carries a disk 16 at its upper end and a disk 17 at its lower end, the disk 16 being loosely mounted on the rod while the disk 17 is provided with a threaded hub 18 for engagement with the threaded end of the rod. The upper disk 16 is adapted to engage the cylindrical surface 19 of the member 2 and thus form between such disk 16 and the disk 9 a pneumatic chamber 20, while the disk 17, which is of somewhat less diameter than the disk 16, fits within the end of the casing 8. Between the two disks 16 and 17 is located the spring, which in the present form thereof is shown as a compression spring 21, which compression spring is of double pyramidal volute type preferably made of one piece of flat spring stock, so that vertical stresses either up or down will operate to compress the spring of this improved shock absorber.

The casing 8 forms a grease or oil chamber and in practice the disk 17 will be provided with a series of valves 22 so formed and located therein that when the disk 17 moves downward for instance, the oil in the casing 8 will pass between the edge of the disk and the wall of the casing and the pressure on the valves will close them so that oil can only pass into the upper part of the casing at a predetermined rate, but when the disk moves upward the pressure of the oil will open the valves so that oil can pass not only between the edges of the disk and the wall of the casing but also through the valve seats into the lower part of the casing. In the present instance the valve seats are formed by threaded plugs 23, having an opening 24 therethrough, threaded into tapered holes 25 of the disk, and in these tapered holes is located a ball valve 26 supported by a spider 27.

From the foregoing it will be seen that by reason of the lower disk, owing to its construction and arrangement, there is a hydraulic action at this part of the shock absorber, and that by reason of the formation and arrangement of the disks 9 and 16 and the member 2 there is a pneumatic action at this point of the shock absorber, while between the pneumatic and hydraulic portions of the shock absorber there is a spring action, thus providing a highly efficient shock absorber which has proven very superior and efficient in practice.

In the present instance the attaching means or bolts 11 and 12 are carried by relatively sliding spaced arms, as hereinbefore stated, one pair secured to what may be considered as the piston chamber and the other pair secured to what may be considered as the piston working within said chamber, while the upper disk 16 is in the form of a washer loosely mounted upon the rod 15 so as to make a tight sliding fit within the oil containing casing 8 and against the under surface 19 of the member 2. It will also be observed that although the two disks 16 and 17 are carried by the bolt or rod 15 secured to the member 3, that nevertheless, owing to the fact that the disk 16 at certain times engages the under surface of the member 2, the spring coöperates with the member 2 as well as with the member 3. The lower disk 17 is adjustable so as to regulate the tension on the spring when this is desired. In practice, of course, the spring is normally under compression and this compression is increased by the relative vertical movements of the parts, and that by the detachment of the housing or casing the entire internal mechanism of the device may be readily inspected. It will also be observed that this shock absorber while as shown is intended to hang down in the manner illustrated in Fig. 1, could, by a rearrangement of the valves, be reversed. Moreover, the various details may be more or less changed without departing from the spirit or scope of the improvement, and that the improvement, as stated, is comparatively inexpensive to make and is of easy application to a vehicle.

In practice it will be observed that the disk 16 normally maintains the air chamber 20 closed by reason of the spring 21 located between this disk 16 and the disk 17. Consequently the shock is absorbed partially by the air within the chamber 20, being more tightly compressed by reason of the movement of the piston or of the chamber carrying the piston when these parts move relatively to each other, and such shock is also to a certain extent absorbed when the piston moves for instance in one direction by the oil within the casing 8, which cushions the disk 17 by reason of the fact that this oil is permitted to pass comparatively slowly between the casing 8 and the edge of the disk 17. Thus the relative movements of the piston member 3 and the chamber carrying member 2 are such that when the disk 17 and the curved end of the chamber 8 are brought in closer engagement by the action of the vehicle the oil is compressed to a greater extent, absorbing the shock and causing it to pass, as stated, between the edge of the disk 17 and the casing 8 into the upper part of the chamber, it returning through the valves 22 when this compressive action ceases.

I claim as my invention:

1. A shock absorber comprising a member having a piston chamber and means for attachment to one part of a vehicle, a piston carried by said member and reciprocating in said chamber and also having means at the same end for attachment to another part of the vehicle, a casing carried by said member in line with said attaching means, and means connected with said piston and located in said casing and operative in the casing against liquid simultaneously with a pneumatic action effected by the reciprocation of the piston in the piston chamber.

2. A shock absorber comprising a member having a piston chamber and means for attachment to one part of a vehicle, a piston carried by said member and reciprocating in said chamber and also having means at the same end for attachment to another part of the vehicle, a casing carried by said member in line with said attaching means, means connected with said piston and located in said casing and operative in the casing against liquid simultaneously with a pneumatic action effected by the reciprocation of the piston in the piston chamber, and a spring within said casing and coöperating with said piston for obtaining a spring action.

3. A shock absorber comprising a member having a piston chamber and means for attachment to one part of a vehicle, a piston carried by said member and reciprocating in said chamber and also having means for attachment to another part of the vehicle, a casing carried by said member, means connected with said piston and located in said casing and operative in the casing against liquid simultaneously with a pneumatic action effected by the reciprocation of the piston in the piston chamber, and a spring located in line with said last means and coöperating with said piston.

4. A shock absorber comprising a member having means for attachment to one part of a vehicle, a piston carried by said member and also having means for attachment to another part of the vehicle, a casing carried by said member, means coöperating with said piston for obtaining a pneumatic action, means coöperating with said casing for obtaining a hydraulic action, and a spring located in line with and between said last two means.

5. A shock absorber comprising a member having a piston chamber and means for attachment to one part of a vehicle, a piston carried by said member and reciprocating in said chamber and also having means for attachment to another part of the vehicle, a casing carried by said member, means connected with said piston and located in said casing and operative in the casing against liquid simultaneously with a pneumatic action effected by the reciprocation of the piston in the piston chamber, a spring located in line with said last means and coöperating with said piston, said spring comprising a double acting volute pyramidal spring, and the organization being such that vertical stresses in either direction will compress said spring.

6. A shock absorber comprising a member having a chamber and a casing, a member sliding within said chamber and having a rod projecting into said casing, a pair of disks carried by said rod one for closing the lower end of said chamber, and a spring between said disks.

7. A shock absorber comprising a member having a chamber and a casing, a member sliding within said chamber and having a rod projecting into said casing, a pair of disks carried by said rod one for closing the lower end of said chamber, and a double acting volute pyramidal spring between said disks whereby the vertical stresses in either direction will compress said spring.

8. A shock absorber comprising a member having a chamber and a casing and spaced arms carrying vehicle attaching means, a member sliding within said chamber and also having spaced arms sliding relatively to said first spaced arms and also carrying vehicle attaching means, said sliding member also having a rod projecting into said casing, a pair of disks carried by said rod, one a loosely fitting disk for closing the lower end of said chamber, and a volute pyramidal spring between said disks.

9. A shock absorber comprising a member having a piston chamber and provided with a pair of spaced arms, a piston within said chamber and also having a pair of spaced arms, each pair of arms carrying means for attaching the device to a vehicle, one of said pair of arms having an elongated slot for the passage therethrough of the vehicle attaching means of the other pair of arms, a casing secured to said piston chamber member, a bolt secured to said piston and projecting into said casing, a pair of disks secured to said bolt, and a spring between said disks.

10. A shock absorber comprising a member having a piston chamber and provided with a pair of spaced arms of concavo-convex form, a piston within said chamber and also having a pair of spaced arms fitting within the arms of said piston chamber member, each pair of arms carrying means for attaching the device to a vehicle, said second pair of arms having an elongated slot for the passage therethrough of the vehicle attaching means of the other pair of arms, a casing secured to said piston chamber member, a bolt secured to said piston and projecting into said casing, a pair of disks secured to said bolt, and a spring between said disks.

11. A shock absorber comprising a member having a piston chamber and provided with a pair of spaced arms, a piston within said chamber and also having a pair of spaced arms, each pair of arms carrying means for attaching the device to a vehicle, one of said pair of arms having an elongated slot for the passage therethrough of the vehicle attaching means of the other pair of arms, a casing secured to said piston chamber member, a bolt secured to said piston and projecting into said casing, a pair of disks secured to said bolt, a spring between said disks, and one or more valves carried by one of said disks.

12. A shock absorber comprising a member having a piston chamber and provided with a pair of spaced arms, a piston within said chamber and also having a pair of spaced arms, each pair of arms carrying means for attaching the device to a vehicle, one of said pair of arms having an elongated slot for the passage therethrough of the vehicle attaching means of the other pair of arms, a casing secured to said piston chamber member, a bolt secured to said piston and projecting into said casing, a pair of disks secured to said bolt, a spring between said disks, and one or more valves carried by one of said disks, said valve carrying disk being of less diameter than said casing to form a fluid passage therebetween.

13. A shock absorber comprising a member having a chamber and a casing, a member sliding within said chamber and having a rod projecting into said casing, a pair of disks carried by said rod, one for closing the lower end of said chamber, a spring between said disks, and one or more valves carried by one of said disks.

14. A shock absorber comprising a member having a chamber and a casing, a member sliding within said chamber and having a rod projecting into said casing, a pair of disks carried by said rod, one for closing the lower end of said chamber, a spring between said disks, and one or more valves carried by one of said disks, said valve carrying disk being of less diameter than said casing to form a fluid passage therebetween.

15. A shock absorber comprising a cylindrical member having a chamber and a pair of spaced arms provided with vehicle attaching means, a disk slidable within said chamber and also provided with a pair of spaced arms having vehicle attaching means and elongated slots for the passage of the vehicle attaching means of the cylindrical member, a rod carried by said disk, a pair of disks mounted on said rod, a volute pyramidal spring between said disks, and a housing surrounding said disks.

16. A shock absorber comprising a cylindrical member having a chamber and a pair of spaced arms provided with vehicle attaching means, a disk slidable within said chamber and also provided with a pair of spaced arms having vehicle attaching means and elongated slots for the passage of the vehicle attaching means of the cylindrical member, a rod carried by said disk, a pair of disks mounted on said rod, a spring between said disks, and a housing surrounding said disks, the disk located adjacent to one end of the device having less diameter than said casing to form a fluid passage therebetween.

17. A shock absorber comprising a cylindrical member having a chamber and a pair of spaced arms provided with vehicle attaching means, a disk slidable within said chamber and also provided with a pair of spaced arms having vehicle attaching means and elongated slots for the passage of the vehicle attaching means of the cylindrical member, a rod carried by said disk, a pair of disks mounted on said rod, a spring between said disks, and a housing surrounding said disks, the disk located adjacent to one end of the device having less diameter than said casing to form a fluid passage therebetween, and one or more valves carried by said disk.

18. A shock absorber comprising a cylindrical member having a chamber and a pair of spaced arms provided with vehicle attaching means, a disk slidable within said chamber and also provided with a pair of spaced arms having vehicle attaching means and elongated slots for the passage of the vehicle attaching means of the cylindrical member, a rod carried by said disk, a pair of disks mounted on said rod, a volute pyramidal spring between said disks, and a housing surrounding said disks, the disk located adjacent to one end of the device having less diameter than said casing to form a fluid passage therebetween, and one or more valves carried by said last disk.

19. A shock absorber comprising a member having a chamber, a disk fitting and sliding within said chamber and having a rod projecting therefrom, a pair of disks carried by said rod, one for closing the lower end of said chamber, a spring between said disks, and spaced arms carried by each of said members for attachment to a vehicle.

20. A shock absorber comprising a member having a chamber, a disk fitting and sliding within said chamber and having a rod projecting therefrom, a pair of disks carried by said rod, one for closing the lower end of said chamber, a spring between said disks, and spaced arms carried by each of said members for attachment to a vehicle, the chamber closing disk having a sliding engagement with said rod.

21. A shock absorber comprising a member having a chamber, a disk fitting and sliding within said chamber and having a rod projecting therefrom, a pair of disks carried by said rod, one for closing the lower end of said chamber, a double acting volute pyramidal spring between said disks, and spaced arms carried by each of said members for attachment to a vehicle.

22. A shock absorber comprising a member having means for attaching it to one part of a vehicle and having a piston chamber, a piston fitting and sliding within said chamber and having means for attachment to another part of the vehicle and also having a rod projecting therefrom, a spring located on said rod, means at one end of said rod for maintaining the spring on the rod, and means at the opposite end of the spring to effect coöperation between it and the piston.

23. A shock absorber comprising a member having means for attaching it to one part of a vehicle and having a piston chamber, a piston fitting and sliding within said chamber and having means for attachment to another part of the vehicle and also having a rod projecting therefrom in a direction opposite to the attaching means, a double acting volute pyramidal spring located on said rod and means also located on the rod at each end of said spring and coöperating therewith whereby the vertical stresses in either direction will compress said spring.

24. A shock absorber comprising a member having a piston chamber and provided with a pair of spaced arms, a piston within spaced arms, each pair of arms carrying means for attaching the device to a vehicle, a bolt secured to said piston and projecting in a direction opposite to the projection of said arms, a pair of disks carried by said bolt, and a spring between said disks, one of said disks being loosely mounted on the bolt.

JOHN GRAW ROCK.

Witnesses:
F. E. BOYCE,
WALTER L. BAKELAR.